(12) United States Patent
Meixner

(10) Patent No.: US 9,286,114 B2
(45) Date of Patent: Mar. 15, 2016

(54) SYSTEM AND METHOD FOR LAUNCHING DATA PARALLEL AND TASK PARALLEL APPLICATION THREADS AND GRAPHICS PROCESSING UNIT INCORPORATING THE SAME

(71) Applicant: Nvidia Corporation, Santa Clara, CA (US)

(72) Inventor: Albert Meixner, Mountain View, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 472 days.

(21) Appl. No.: 13/713,305

(22) Filed: Dec. 13, 2012

(65) Prior Publication Data

US 2014/0173611 A1    Jun. 19, 2014

(51) Int. Cl.
G06F 9/48    (2006.01)
G06F 9/50    (2006.01)
G06F 9/46    (2006.01)
G06F 9/38    (2006.01)

(52) U.S. Cl.
CPC ............ *G06F 9/4843* (2013.01); *G06F 9/3851* (2013.01); *G06F 2209/5018* (2013.01)

(58) Field of Classification Search
None
See application file for complete search history.

(56) References Cited

U.S. PATENT DOCUMENTS

| 2005/0117576 | A1* | 6/2005 | McDysan et al. | 370/389 |
| 2007/0198628 | A1* | 8/2007 | Bates et al. | 709/201 |
| 2009/0037926 | A1* | 2/2009 | Dinda et al. | 718/107 |

* cited by examiner

*Primary Examiner* — Eric C Wai

(57) ABSTRACT

A system and method for launching data parallel and task parallel application threads. In one embodiment, the system includes: (1) a global thread launcher operable to retrieve a launch request from a queue and track buffer resources associated with the launch request and allocate output buffers therefor and (2) a local thread launcher associated with a streaming multiprocessor and operable to receive the launch request from the global thread launcher, set a program counter and resource pointers of pipelines of the streaming multiprocessor and receive reports from pipelines thereof as threads complete execution.

15 Claims, 3 Drawing Sheets

SYSTEM AND METHOD FOR LAUNCHING DATA PARALLEL AND TASK PARALLEL APPLICATION THREADS AND GRAPHICS PROCESSING UNIT INCORPORATING THE SAME

TECHNICAL FIELD

This application is directed, in general, to processors and, more specifically, to a system and method for launching various types of application threads in a processor.

BACKGROUND

As those skilled in the pertinent art are aware, applications may be executed in parallel to increase their performance. "Data parallel" applications carry out the same process concurrently on different data. "Task parallel" applications carry out different processes concurrently on the same data. Hybrid data/task parallel applications exist as well. "Static parallel" applications are applications having a degree of parallelism that can be determined before they execute. In contrast, the parallelism achievable by "dynamic parallel" applications can only be determined as they are executing. Whether the application is data or task parallel, or static or dynamic parallel, it may be executed in a pipeline which is often the case for graphics applications.

A streaming multiprocessor (SM) is a data processor architecture featuring multiple (typically many) pipelined streaming processors, shared memory and a unified instruction fetch/dispatch unit. SMs have many uses; one is as part of a graphics processing unit (GPU), in which SMs can be employed alone or together with other SMs.

GPUs employ two separate mechanisms for launching threads of applications into SMs, a process sometimes called "creating work." The first of the two mechanisms for creating work is a compute-focused launch mechanism optimized for launching a dynamic parallel application or "grid launching" a static parallel application. The second is a graphics-focused launch mechanism for efficiently launching cooperative thread arrays (CTAs) into graphics pipelines. The graphics-focused launching mechanism is deeply intertwined with functional units inside the SM therefore offers only limited configuration options.

SUMMARY

One aspect provides a system for launching data parallel and task parallel application threads. In one embodiment, the system includes: (1) a global thread launcher (TLG) operable to retrieve a launch request from a queue and track buffer resources associated with the launch request and allocate output buffers therefor and (2) a local thread launcher (TLL) associated with an SM and operable to receive the launch request from the TLG, set a program counter and resource pointers of pipelines of the SM and receive reports from pipelines thereof as threads complete execution.

Another aspect provides a method of launching data parallel and task parallel application threads. In one embodiment, the method includes: (1) retrieving a launch request from a queue, (2) tracking buffer resources associated with the launch request with a TLG, (3) employing the TLG to allocate output buffers, (4) forwarding the launch request to a TLL associated with an SM, (5) setting a program counter and resource pointers of pipelines of the SM and (6) receiving reports from pipelines thereof as threads complete execution with the TLL.

Another aspect provides a GPU. In one embodiment, the GPU includes: (1) a plurality of SMs, (2) a TLG operable to retrieve a launch request from a queue and track buffer resources and any interlocks associated with the launch request and allocate output buffers therefor and (3) a TLL associated with each of the plurality of SMs and operable to receive the launch request from the TLG, set a program counter and resource pointers of pipelines of a respective one of the plurality of SMs and receive reports from pipelines thereof as threads complete execution.

BRIEF DESCRIPTION

Reference is now made to the following descriptions taken in conjunction with the accompanying drawings, in which.

DETAILED DESCRIPTION

As stated above, current GPUs employ two separate mechanisms for launching threads of applications into SMs: a compute-focused launch mechanism and a graphics-focused launch mechanism. The former is typically used to launch dynamic parallel threads, and the latter is typically used to launch pipeline parallel threads.

It is realized herein that, while the compute-focused launch mechanism is flexible, its flexibility stems from its heavy dependence on software to configure and schedule the needed hardware resources, which hampers its speed. It is also realized herein that, while the graphics-focused launch mechanism is faster than the compute-focused launch mechanism, its speed and power arise from its hardware dependence, making it relatively inflexible. It is yet further realized herein that these separate launch mechanisms can be unified to increase either or both of flexibility and speed.

Accordingly, introduced herein are various embodiments of a system and method for launching both dynamic parallel and pipeline parallel application threads, hereinafter sometimes referred to as a unified system or unified method. In certain embodiments, the unified system and method provides hardware mechanisms to launch both dynamic parallel and pipeline parallel threads, but leaves scheduling and configuration decisions to software to enhance flexibility. In certain embodiments to be illustrated and described, the system is divided into local components associated with the SMs of a processor and a global component that coordinates among the local components.

Figure 1:
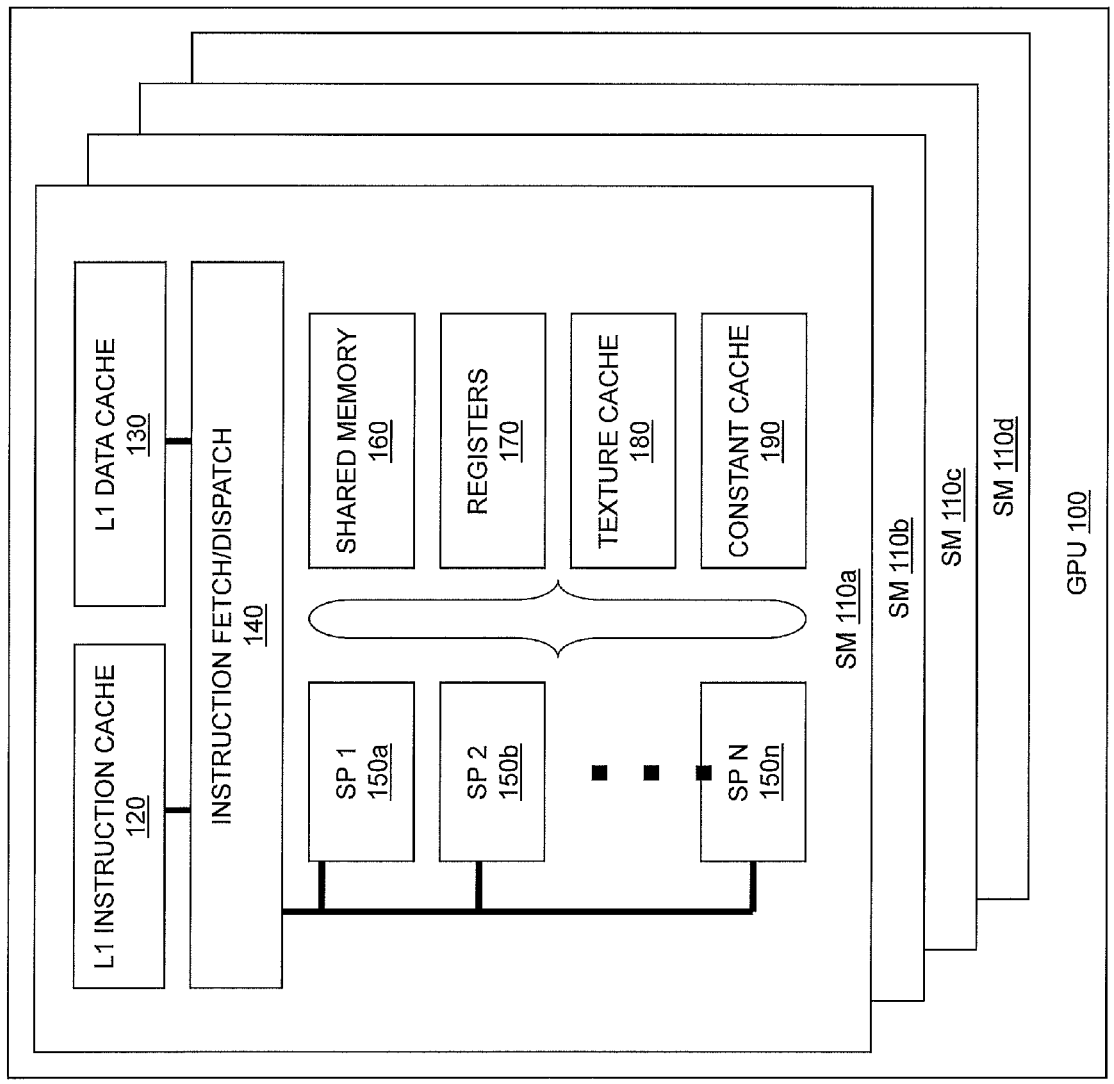
FIG. 1 is a block diagram of a GPU incorporating a system or method for launching data parallel and task parallel application threads.

Before describing embodiments of the unified system and method, a GPU architecture will be described. FIG. 1 is a block diagram of a GPU 100 incorporating a system or method for launching data parallel and task parallel application threads. The GPU 100 includes multiple streaming multiprocessors (SMs) 110a, 110b, 110c, 110d. Only the SM 110a will be described, with the understanding that the other SMs 110b, 110c, 110d are of similar architecture. In the embodiment of FIG. 1, the SMs 110a, 110b, 110c, 110d have a single-instruction, multiple-data (SIMD) architecture. Other embodiments employ other architectures.

The SM 110a includes a level-1 instruction cache 120 and a level-1 data cache 130. An instruction fetch/dispatch unit 140 is configured to fetch instructions and dispatch them to various streaming processors (SPs) 150a, 150b, 150n for execution. Each SP 150a, 150b, 150n is configured to receive instructions dispatched to them from the L1 instruction cache 120, fetch germane operands from the L1 data cache 130, execute the instructions and write results back to memory. One embodiment of the SM 110a has four SPs 150a, 150b, 150n. Other embodiments of the GPU 100 have lesser or greater numbers of streaming cores 150a, 150b, 150n.

In the illustrated embodiment, the SM 110a also includes a shared memory 160, registers 170, a texture memory cache 180 and a constant memory cache 190. Other embodiments of the SM 110a omit one or more of the shared memory 160, the registers 170, the texture memory cache 180 and the constant memory cache 190, include further portions or units of memory or arrange the memory in a different way.

Figure 2:
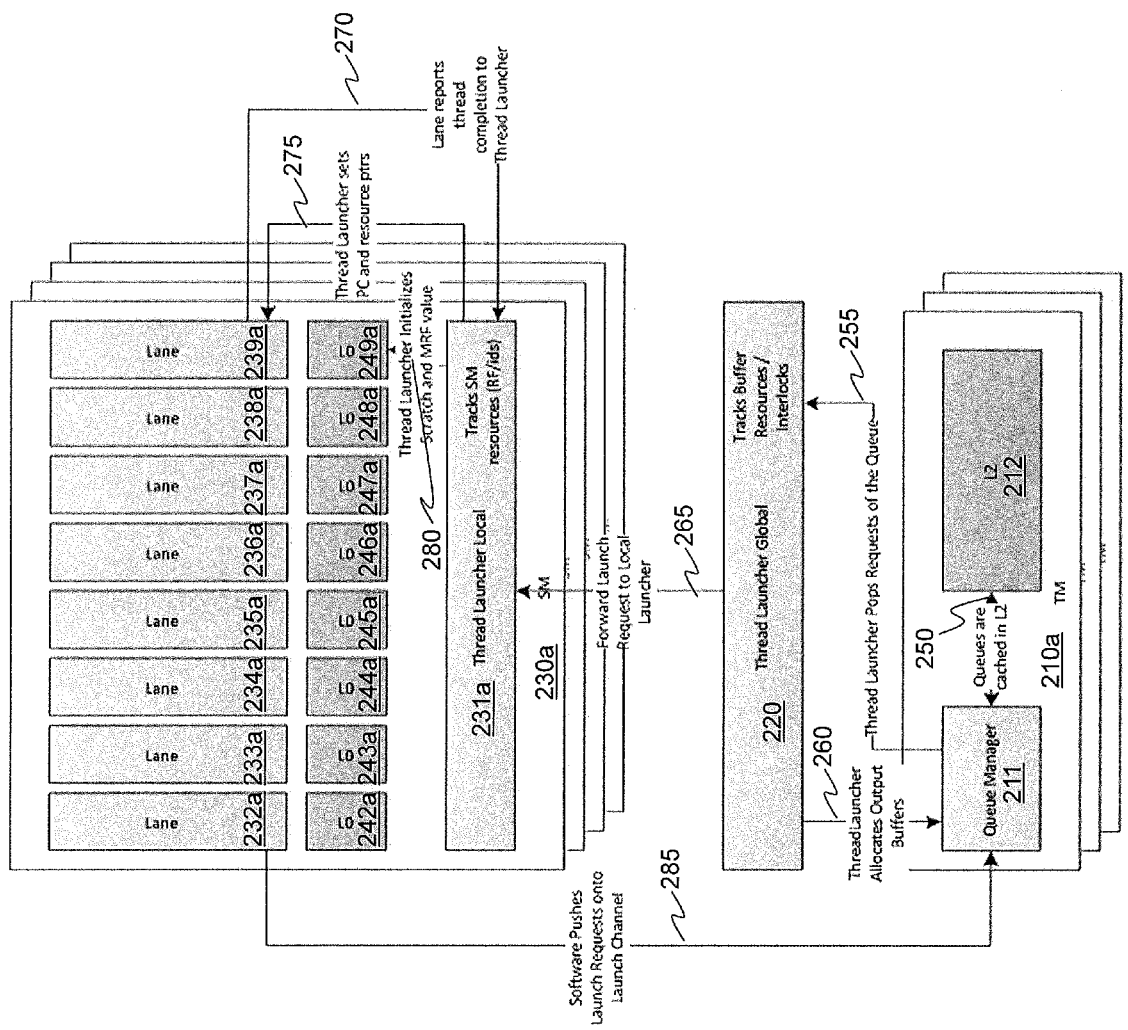
FIG. 2 is a block diagram of one embodiment of a system for launching data parallel and task parallel application threads.

FIG. 2 is a block diagram of one embodiment of a system for launching data parallel and task parallel application threads. The illustrated embodiment of the system is configured to operate in the context of a processor having four SMs, one of which being designated 230a. The SM 230a includes eight SPs, each having a pipeline, or "lane" 232a, 233a, 234a, 235a, 236a, 237a, 238a, 239a and an L0 cache memory 242a, 243a, 244a, 245a, 246a, 247a, 248a, 249a. A memory, which may be a tile memory (TM), is divided into four corresponding sections, one of which being designated 210a. The section 210a includes a queue manager 211 and a cache memory 212. The queue manager 211 is generally configured to receive launch requests (e.g., from the SM 230a) and cache the launch requests in a queue in the cache memory 212.

The illustrated embodiment of the system is generally divided into two portions: a TLG 220, and a TLL 231a for each of the SMs, including the SM 230a. The TLG and TLL cooperate to act as a management unit for the SMs and global memory buffers. Each TLL tracks hardware-managed resources (e.g., the address register file, or ARF; matrix register file, or MRF; and scratch, or L0 cache, memory) and launches thread groups onto the SM. The illustrated embodiment of the thread launcher is designed to support both dynamic parallelism (CNP/GWC) as well as pipeline parallelism (graphics pipeline).

Various embodiments of the TLG 220 are responsible for maintaining the launch slots and arbitrating between them, fetching requests from the launch queues, work expansion, allocating output buffer, load balancing between SMs, and enforcing interlocks. Each TLL (e.g., the TLL 231a) is responsible for managing SM-local resources (e.g., the address register file, or ARF; matrix register file, or MRF; and scratch, or L0 cache, memory) and load balancing between the lanes of its respective SM (e.g., the lanes 232a, 233a, 234a, 235a, 236a, 237a, 238a, 239a of the SM 230a).

As stated above, the launch channels allow threads to be launched. In the illustrated embodiment, a launch channel is a memory-mapped structure that contains meta-data about the work to be launched, as well as a pointer to a queue that contains launch requests, which takes the form of a launch queue managed by the queue manager 211. To launch threads, a launch descriptor is first created via a system call to the OS. An application can create an arbitrary number of launch channels. However, the illustrated embodiment of the thread launcher supports a limited number of active launch channels. In one embodiment, the number of launch channels that may be concurrently active is sufficient to run a raster pipeline without OS intervention.

In the illustrated embodiment, the OS activates the launch channel by binding the descriptor into a software-described launch channel. Table 1, below, sets forth one embodiment of a description of a launch channel.

TABLE 1

Example Launch Channel Description
Table 1 Launch Channel Description

| Field | Type | Comment |
| --- | --- | --- |
| Request Queue | 64-bit pointer | Pointer to request queue |
| Priority | 8-bit integer | Priority for arbiter |
| ASID | Address space identifier | Process/Address Space Identifier for launched threads |
| Group Size | 10-bit integer | Number of threads per group, depends on max threads per SM |
| MRF entries | 8-bit integer | MRF registers per thread |
| ARF entries | 8-bit integer | ARF registers per thread |
| L0 scratch space | 16-bit integer | Scratch space allocated per group |
| Dimensions | 1D, 2D, 3D | Used in init value creation |
| Per-Thread Init Value Mask | INIT_X | INIT_Y | INIT_Z | INIT_THREAD_ID | Mask to specify what init values are generated per thread |
| Per-Group Init Value Mask | INIT_CHANNEL | Mask to specify what init values are generate per group |
| Per-Request Control Mask | REQ_USERDATA, REQ_FLUSH, REQ_MASK, REQ_STATE | Select if the channel supports inline flushes and what hardcoded token to use |
| Launch Control Flags | FLAG_BATCH_LAUNCH, FLAG_DYNAMIC_SIZE, FLAG_LAUNCH_MASK, FLAG_LAUNCH_COUNT | Control how input requests are translated into launches |
| Output Queue | 64-bit Pointer | Pointer to output queue |
| Input Batch Size | 16-bit integer | Number of counters in BATCH_LAUNCH request |

As evident from Table 1, a launch channel description may define an input queue for handling launch requests, request batch sizes, information to handle issues of priority among threads, the structure and number of launch requests that can be accommodated in the channel, any masks for launch requests and an output queue for results.

Launch requests typically contain meta-data relating the launch request to a launched thread group as well as any optional control information that the launching software may define and use. Table 2, below, sets forth one embodiment of a description of a launch request.

TABLE 2

Example Launch Request Description

| Field | Type | Comment |
| --- | --- | --- |
| User Data | 64-bit pointer/integer | User data passed to the launched group |
| Flush Control Mask | FLUSH_SM, FLUSH_TILE(?), FLUSH_GLOBAL(?) | Wait for all previous thread groups from this channel within the give scope to complete before launching more work. |
| Mask | 64-bit mask | Mask to determine what threads in the request to launch |
| State | 64-bit pointer | Pointer to a constant buffer table. |

As stated above, launch requests contain meta-data about the work to be launched. In Table 2, the meta-data takes the form of the user data, the flush mask, thread launch mask and state pointer.

Returning to FIG. 2, an example thread launch will now be described. The queue manager 211 stores launch requests in the queue in the cache memory 212, as a line 250 indicates. At the appropriate time, the queue manager 211 retrieves the requests, in order, from the queue. The TLG 220 then begins to track buffer resources and any interlocks as a line 255 indicates. The TLG 220 further employs the queue manager 211 to allocate output buffers as a line 260 indicates.

Next, the TLG 220 forwards the launch request to the appropriate TLL (e.g., the TLL 231a) as a line 265 indicates. The TLL 231a the sets the PC and resource (e.g., output buffer) pointers in the pipelines 232a, 233a, 234a, 235a, 236a, 237a, 238a, 239a as a line 275 indicates. The pipelines 232a, 233a, 234a, 235a, 236a, 237a, 238a, 239a then report back to the TLL 231a as they complete execution of the threads as a line 270 indicates. As stated above, new launch requests are software (e.g., OS)-initiated. Thus, a line 285 indicates that launch requests may issue from the SM 230a to the queue manager 211, whereupon the queue manager 211 stores the new launch requests in the queue in the cache memory 212, as the line 250 indicates.

As stated above, the system is configured to system launch both dynamic parallel and pipeline parallel application threads. The latter involves implementing an effective pipeline in the SM 230a. Accordingly, the system is configured to accommodate work expansion between pipeline stages and flow-control to allow bottleneck stages to throttle earlier pipeline stages.

In the illustrated embodiment, the TLG 220 is configured to enable flow-control via a pointer to an output queue in the launch channel descriptor. When the output queue is present and an ALLOCATE_OUTPUT flag is set, the TLG 220 is configured to issue a push_alloc request to the output buffer for every launch request from a launch channel. Upon issuance of the push_alloc request, the affected launch request is stalled until the push_alloc completes successfully. The handle returned by push_alloc is passed to the launched threads CTA as an input parameter, such that it can be used as an output buffer.

A conventional way to create a pipeline is for each stage to use the following stage's launch queue as its own output queue. Thus, when launches for a given stage are stalled and the launch queue fills up, push_alloc requests for prior stages fail, causing the stall to propagate upstream to match the pipeline throughput to the bottleneck stall.

In the illustrated embodiment, the TLG 220 handles work expansion by allowing a single request to launch multiple threads. This functionality may be enabled via a BATCH_LAUNCH channel flag. If the BATCH_LAUNCH channel flag is enabled, the TLG 220 is configured to read an array of thread counts from the launch request. In the illustrated embodiment, the Input Batch Size field in the channel descriptor controls the size of the array. The TLG 220 is configured to use the counts to determine how many CTAs should be launched. In the illustrated embodiment, each CTA launch is treated as an independent launch, i.e., each CTA has to arbitrate for access to the TLL 231a and acquire an output buffer. Once threads are launched, the TLG 220 is configured to initialize each thread with a pointer to request that was used to create it, the ID of the parent thread that created it, and a unique child ID between 0 . . . N−1, where N is the number of siblings.

In certain embodiments, the TLG 220 is configured to launch CTAs with individual warps being selectively masked off. Masked launches are primarily designed to simply launching of pixel CTAs with a mask generated by the raster unit. In this use case, the TLG 220 effectively performs a compaction to only allocate resources for covered pixel.

In one embodiment, the TLG 220 employs a MASKED_LAUNCH flag in the descriptor. When this flag is set, the TLG 220 is configured to employ a mask in the launch request that contains one bit for each warp in the CTA. If the bit is set to 0, no resources are allocated, and the warp is never launched. In this embodiment, thread ID and position are initialized the same way as they would be for non-masked launches, i.e., ID assignment does not skipped warps that are masked off.

Masked launches can be combined with batched launches (e.g., the BATCH_LAUNCH flag). If both masked and batched launch flags are enabled, the TLG 220 employs a full mask, instead of a thread count, for each input batch entry.

Certain embodiments of the TLG 220 are configured to support tag-based interlocks to ensure selective serialization of launches. A common use for interlocks would be to use map a tiles screen location to a 32-bit tag to ensure that no two conflicting tiles are processed concurrently. In one embodiment, interlocks are accommodated via an INTERLOCK_TAGS flag. If the INTERLOCK_TAGS flag is set, the TLG 220 employs a 32-bit tag provided in every launch request. This tag causes the TLG 220 to stall the request as long as any other request from the same channel with the same tag is executing.

Two tags having special meaning may be employed in the context of interlocks. Threads having the TAG_NO_CONFLICT tag set can always be launched. Threads having the TAG_ALWAYS_CONFLICT tag set cannot be launched as long as any other requests from the same channel are executing.

In the illustrated embodiment, interlocks only work for CTAs launched from the same TLG; no interlock mechanism is provided to prevent conflicting CTAs from being launched by different TLGs. Alternative embodiments provide interlocks for CTAs launched from different TLGs.

In the illustrated embodiment, scratch memory space and register (MRF and ARF) resources are tracked and allocated at block granularity in a per-lane free-list. The block size is software controlled with some minimum size, and addresses within a block are guaranteed to be contiguous. In the illustrated embodiment, registers for a single thread exist in the same block, hence they are contiguous and no renaming table is required. Scratch space for a thread group can consist of multiple non-contiguous blocks and are re-mapped inside the SM to provide a contiguous scratch address space. If registers for multiple threads fit into the same block the allocator may not allocate a new block until the current block is fully used (e.g., a 128 register block can be used for four threads with 32 registers each). To support block sharing, blocks are reference counted.

The illustrated embodiment of the system is constrained by external limitations so as not to hamper its performance. Table 3 gives examples of some external limitations.

TABLE 3

Example External Limitations

| Limiter Speed | Imposed By | Comment |
| --- | --- | --- |
| Thread Groups 1 Per Clock | Queue Controller | 1 queue pop per cycle limits group launch rate. Will only impact small groups. |
| Threads Per 8 Clock | Lane | Lane interface is limited to 1 PC update per lane per cycle |

TABLE 3-continued

Example External Limitations

| Limiter Speed | Imposed By | Comment |
|---|---|---|
| Init Values Per 8 Clock | L0 bandwidth | Init values are written to L0 via a 32B/clk interface. |

Other embodiments employ internal limitations or have no limitations.

Figure 3:
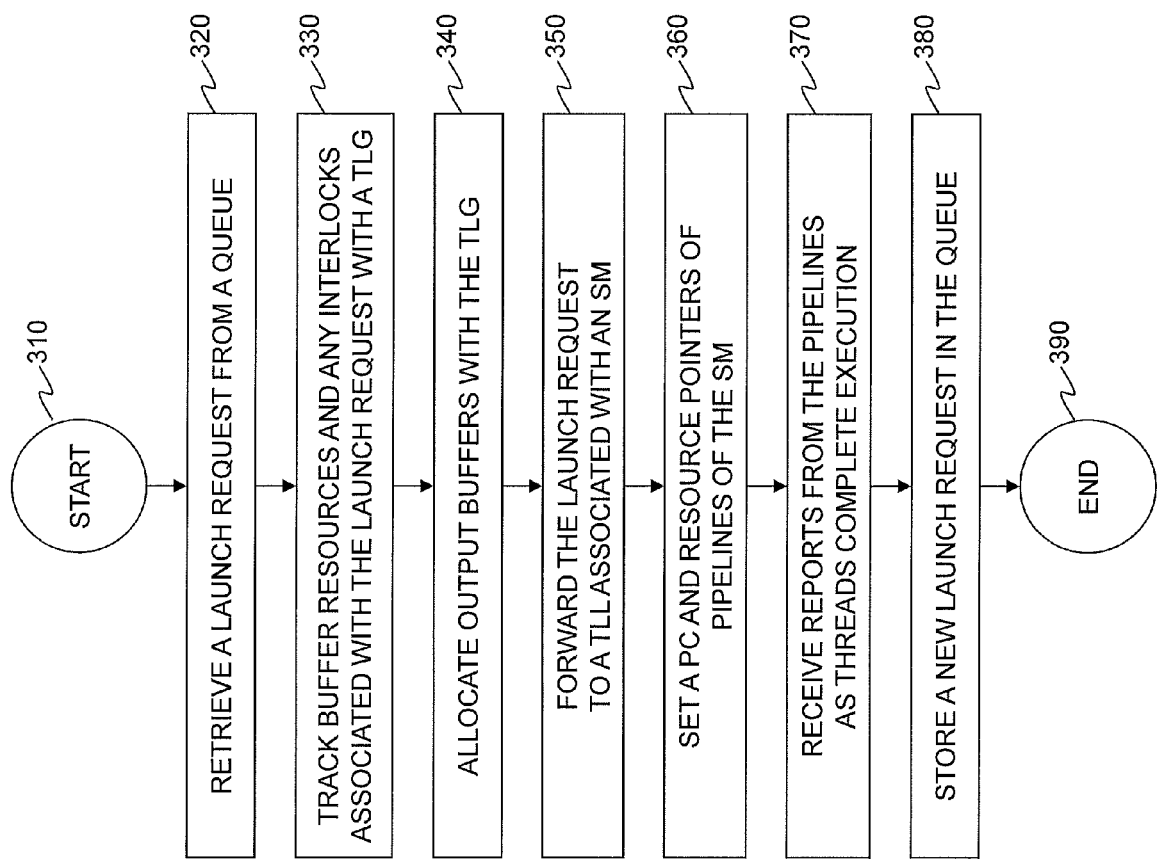
FIG. 3 is a flow diagram of one embodiment of a method of launching data parallel and task parallel application threads.

Some embodiments of the system support software-based freeing of pseudo-resources to allow threads to start in a critical section without forcing full serialization of thread groups. Other embodiments employ a user-specified mask to generate partially populated thread group. Still other embodiments support secondary requests in the allocation stage to allow small launches to bypass large requests when sufficient resources are available FIG. 3 is a flow diagram of one embodiment of a method of launching data parallel and task parallel application threads. The method begins in a start step 310. In a step 320, a launch request is retrieved from a queue. In a step 330, a TLG tracks buffer resources and any interlocks associated with the launch request. In a step 340, the TLG allocates output buffers. In a step 350, the TLG forwards the launch request to a TLL associated with an SM. In a step 360, the TLL sets a PC and resource pointers of pipelines of the SM. In a step 370, the TLL receives reports from the pipelines as threads complete execution. In a step 380, a new launch request is stored in the queue. The method ends in an end step 390.

Those skilled in the art to which this application relates will appreciate that other and further additions, deletions, substitutions and modifications may be made to the described embodiments.

What is claimed is:

1. A system for launching data parallel and task parallel application threads, comprising:
 a global thread launcher operable to retrieve a launch request from a queue and track buffer resources associated with said launch request and allocate output buffers therefor, said global thread launcher included in a processor of said system and said queue and output buffers included in a memory of said system, wherein said global thread launcher is further configured to track any interlocks associated with said launch request;
 a queue manager associated with said global thread launcher and operable to store a new launch request in said queue; and
 a local thread launcher, separate from said global thread launcher and included in a streaming multiprocessor of said system and operable to receive said launch request from said global thread launcher, set a program counter and resource pointers of pipelines of the streaming multiprocessor and receive reports from pipelines thereof as threads complete execution.

2. The system as recited in claim 1 wherein said queue manager is further operable to receive said new launch request via a launch channel.

3. The system as recited in claim 2 wherein said launch channel is software-configurable.

4. The system as recited in claim 2 wherein said launch channel includes a batch launch control flag.

5. The system as recited in claim 1 wherein said launch channel includes a pointer to an output queue.

6. A method of launching data parallel and task parallel application threads, comprising:
 retrieving a launch request from a queue;
 tracking buffer resources associated with said launch request with a global thread launcher, wherein said tracking comprises tracking any interlocks associated with said launch request;
 employing said global thread launcher to allocate output buffers;
 forwarding said launch request to a local thread launcher associated with a streaming multiprocessor, said local thread launcher separate from said global thread launcher;
 setting a program counter and resource pointers of pipelines of said streaming multiprocessor;
 receiving reports from pipelines thereof as threads complete execution with said local thread launcher; and
 storing a new launch request in said queue.

7. The method as recited in claim 6 further comprising receiving said new launch request via a launch channel.

8. The method as recited in claim 7 wherein said launch channel is software-configurable.

9. The method as recited in claim 7 wherein said launch channel includes a batch launch control flag.

10. The method as recited in claim 6 further comprising enabling flow-control via a pointer to an output queue in a launch channel descriptor.

11. A graphics processing unit, comprising:
 a plurality of streaming multiprocessors;
 a global thread launcher operable to retrieve a launch request from a queue and track buffer resources and track any interlocks associated with said launch request and allocate output buffers therefor;
 a queue manager associated with said global thread launcher and operable to store a new launch request in said queue; and
 a local thread launcher, separate from said global thread launcher and associated with each of said plurality of streaming multiprocessors and operable to receive said launch request from said global thread launcher, set a program counter and resource pointers of pipelines of a respective one of the plurality of streaming multiprocessors and receive reports from pipelines thereof as threads complete execution.

12. The graphics processing unit as recited in claim 11 wherein said queue manager is further operable to receive said new launch request via a launch channel.

13. The graphics processing unit as recited in claim 12 wherein said launch channel is software-configurable.

14. The graphics processing unit as recited in claim 12 wherein said launch channel includes a batch launch control flag.

15. The graphics processing unit as recited in claim 11 wherein said launch channel includes a pointer to an output queue.

* * * * *